United States Patent [19]

Rowe et al.

[11] Patent Number: 4,678,622

[45] Date of Patent: Jul. 7, 1987

[54] TRANSIENT MONITOR FOR NUCLEAR REACTOR

[75] Inventors: William S. Rowe; Fred C. Chao, both of San Jose, Calif.

[73] Assignee: General Electric Company, San Jose, Calif.

[21] Appl. No.: 767,551

[22] Filed: Aug. 20, 1985

[51] Int. Cl.[4] .............................................. G21C 17/00
[52] U.S. Cl. .................................... 376/259; 376/216; 376/217; 376/254; 376/255
[58] Field of Search ................ 376/254, 255, 259, 216, 376/217

[56] References Cited

U.S. PATENT DOCUMENTS

| | | | |
|---|---|---|---|
| 3,330,954 | 7/1967 | Cox et al. | 376/255 |
| 3,931,522 | 1/1976 | Rusch | 376/254 |
| 4,133,039 | 1/1979 | Eichenlaub | 376/255 |
| 4,292,129 | 9/1981 | Barry | 376/259 |
| 4,434,132 | 2/1984 | Cook | 376/259 |
| 4,493,811 | 1/1985 | Seki et al. | 376/254 |

FOREIGN PATENT DOCUMENTS

| | | | |
|---|---|---|---|
| 1094698 | 1/1981 | Canada | 376/254 |
| 53-92098 | 8/1978 | Japan | 376/254 |

*Primary Examiner*—Salvatore Cangialosi
*Attorney, Agent, or Firm*—Ivor J. James, Jr.; Raymond G. Simkins

[57] ABSTRACT

A monitored nuclear reactor parameter, such as a startup range neutron monitoring signal, is filtered at a filter having a preselected time constant and amplified with the output being passed to one channel of a two channel comparator. The level of the amplification and the filter time constant are chosen to discriminate between normally increasing startup neutron density including the prompt-jump effect and exponentially increasing neutron density due to the occurrence of reactor casualty in view of the design parameters of the reactor. This same startup range neutron monitoring signal is passed unprocessed to the other channel of the two channel comparator. Comparison of the two signals is made with the binary output of the comparator flagging excess of the unprocessed signal over the filtered and amplified signal. Presence of the appropriate reactor flag is typically used to cause rod withdrawal blockage and/or SCRAM. The time constant of the filter causes the monitored neutron density signal to be delayed in its tracking of reactor startup. The level of amplification of the monitored neutron density signal establishes the reference level in the comparator which when exceeded sets the comparator flag. Consequently, comparator response time varies inversely with the severity of increase in neutron density. Preferably a first amplification level is used for determining rod withdrawal block and a second and higher level of amplification is used for plant SCRAM comparators. A dynamic display to the operator of comparison between monitored neutron density and the dynamically tailored trip levels is provided.

18 Claims, 15 Drawing Figures

TRANSIENT MONITOR FOR NUCLEAR REACTOR

BACKGROUND OF THE INVENTION

This invention pertains to the mitigation of transients in reactors by automatic initiation of reactor shutdown or prevention of control rod withdrawal when high rates of core power increase (as evidenced by neutron density or pressure increase) are detected. The system is applicable to Boiling Water Nuclear Reactors and other processes in which a rate limiting function is required.

SUMMARY OF THE PRIOR ART

Figure 2:
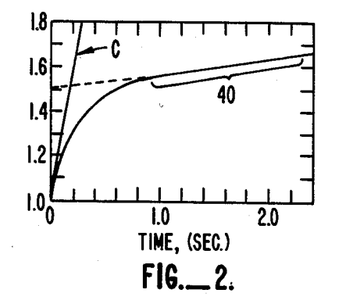
FIG. 2 is a diagram of the prompt-jump event with a casualty event superimposed thereon for comparison.

Intermediate range neutron monitoring and wide range neutron monitoring must accommodate the so-called "prompt-jump" phenomenon encountered on reactor startup (see FIG. 2). Typically, with control rod withdrawal of even a small amount, a short duration, exponential-like increasing transient of neutron density occurs. This initial rapid rate of increase or transient in the neutron density is not a reactor casualty; this rate results from normal reactor physics. After the initial transient, the reactor settles to a slower relatively slow exponential rate of increase. This rate of increase will gradually settle to a steady state condition (not shown in FIG. 2).

Unfortunately, actual reactor casualties have the same initial rapidly increasing profile or transient. Consequently, in monitoring normal reactor startup, discrimination from reactor casualty must be provided. In the case of a reactor casualty, a rapidly increasing transient keeps on increasing. The monitoring system must react in the quickest possible time to the transient increase or reactor casualty.

The prior art has solved this problem by providing multiple level ranges to cover the many decades of power increase during normal reactor startup. These multiple trip level ranges are manually up-ranged by the operator during normal reactor startup. Thus, the permissible levels of increases in neutron density go up in discrete jumps as the reactor is brought on line. Consequently, the response time of the monitoring system depends upon when the current chosen range of the manually up-ranged signal is exceeded.

Typically, these manually upranged reactor startup systems do not prevent control rod withdrawal when the startup rate is already fast. In such circumstances, a single six-inch notch of control rod withdrawal can cause SCRAM, i.e., automatic shutdown, and loss of reactor availability where, if control rod withdrawal had been temporarily blocked, levels requiring SCRAM of the reactor would not have been achieved.

Rate of increase based systems, such as increase in neutron density, have adopted various delays to screen the prompt-jump. Most commonly, an artificially induced time period is utilized. Obviously, when the casualty is operating under the umbrella of the artificially induced time period, the casualty gets an unnecessary head start for the full time period. This is because the time delay produces a dead band or unresponsive period in the casualty response instrumentation of the reactor.

Displays relating to startup neutron density now utilized by operators are not particularly informative. These displays typically show the instantaneous rate of neutron density increase or current absolute neutron density. Such displays do not provide for comparison of a signal to a dynamic trip level.

SUMMARY OF THE INVENTION

A monitored nuclear reactor parameter, such as a startup range neutron monitoring signal, is filtered at a filter having a preselected time constant and amplified with the output being passed to one channel of a multi-channel comparator. The level of the amplification and the filter time constant are chosen to discriminate between normal exponentially increasing startup neutron density including the prompt-jump, and exponentially increasing neutron density due to the occurrence of a reactor casualty in view of the design parameters of the reactor. This same startup range neutron monitoring signal is passed unprocessed to the other channel of the two channel comparator. Comparison of the two signals is made with the binary output of the comparator flagging excess of the unprocessed signal over the filtered and amplified signal. Presence of the appropriate reactor flag is typically used to cause rod withdrawal blockage and/or SCRAM. The time constant of the filter causes the monitored neutron density signal to be delayed yet actively track the normal reactor startup. The level of amplification applied to the monitored neutron density signal establishes the reference level in the comparator which when exceeded sets the comparator flag. Consequently, comparator response time varies inversely with the severity of the rate and duration of the rate of increase in neutron density. Preferably a first amplification level is used for determining rod withdrawal block and a second and higher level of amplification is used for plant SCRAM comparators. A dynamic display to the operator of comparison between monitored neutron density and the dynamically tailored trip levels is provided.

OBJECTS AND ADVANTAGES

An object of this invention is to provide a dynamically tailored trip level for a monitored nuclear reactor parameter such as neutron density or reactor pressure. For a nuclear reactor, this dynamically tailored trip level is responsive to the magnitude and duration of the rate of increase. Taking the case of a startup range neutron monitor output signal, this signal is filtered through a filter having a discrete time constant, amplified, and passed to a first gate of a comparator. The second gate of the comparator contains the direct output of the startup range neutron monitor. Where the direct output exceeds the filtered and amplified output, the comparator flag is set. Responsive to the flag, warning is issued to the operator and/or automatic control system and safety action undertaken including rod withdrawal block and/or plant SCRAM.

An advantage of this aspect of the invention is that the startup range trip levels are continuously and dynamically upranged. By choosing the gain of the amplifier and the time constant of the filter, the time to trip can be tailored to an optimum rate of response for the particular reactor design utilized.

A further advantage of this invention is that the time in which the trip reacts to a rate of increase is inversely proportional to the rate of increase. No longer is the window of a constant time interval or dead band available for a casualty to gain momentum. A casualty, depending upon its severity, produces an increasingly shorter trip response time.

A further advantage of this system and its shortened response time is that additional time is provided for operator response. In the case of control rod withdrawal blockage, the operator is given additional time to insert control rods to prevent plant SCRAM and plant unavailability. Further early control rod withdrawal block can provide the operator with a time window where reactor startup can be smoothed. Conversely, parameters can be chosen such that with an automated reactor startup control system, faster startup rates without inadvertent SCRAM can be achieved than by manual operator startup.

Yet another object of this invention is to provide a graphic display of the rate of increase of the monitored reactor parameter, such as neutron density, versus the dynamically tailored trip levels. An analog comparator, such as a bar graph or gauge indicates current neutron density relative to one or more trip levels. For the first time, the operator can see approach to a continually adjusted trip level based on the permissible dynamic rate of parameter increase. Startup can be tailored to accommodate the discontinuity of the promptjump effect and yet remain within safe startup rate of increase levels.

Other objects, features and advantages of this invention will become more apparent after referring to the following diagram and attached graphic information in which:

DETAILED DESCRIPTION OF THE EMBODIMENTS

Figure 1:
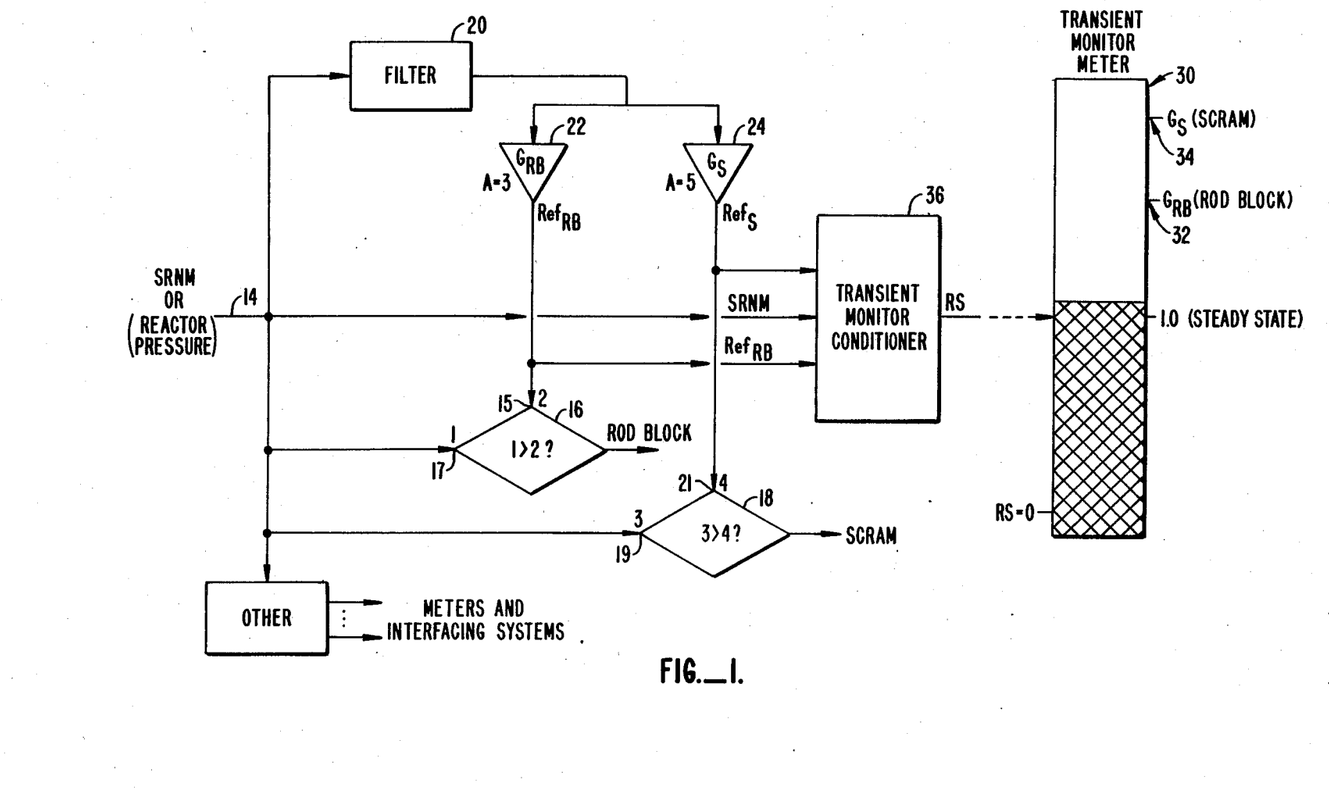
FIG. 1 is a system schematic of the disclosed transient monitor for a nuclear reactor.

FIG. 1 is a schematic of the trip design utilizing this invention. The output of a monitored reactor parameter, here a conventional startup range neutron monitor 14 is received. This signal is passed to two comparators 16 and 18, each comparator having two inputs and one binary output. As here illustrated comparator 16 is used for rod block and comparator 18 for plant SCRAM. Such input occurs respectively at inputs 17 and 19 to the respective comparators 16 and 18.

The signal is filtered at a filter 20 and thereafter passed through paired amplifiers 22, 24. Amplifier 22 has a gain of 3 and outputs to input 15 of rod block comparator 16. Amplifier 24 has a gain of 5 and outputs to input 21 of SCRAM comparator 18.

Stopping here, an oversimplified explanation of the invention can occur. The filter 20 produces, dependent upon its time constant, a delay or retardation of the signal. This delayed signal is thereafter amplified by the amplifiers 22, 24. The delayed and amplified signal is then compared to the current signal output. Depending upon the amplification level, rod block will first occur responsive to the flag of rod block comparator 16. The plant operator (or automatic startup control system) will be prevented from withdrawing rods to further increase reactor neutron density and energy output rate.

Secondly, and assuming a reactor is further from control, where the startup range neutron monitor signal input at 19 exceeds that permissible for plant safety at SCRAM comparator input 21, plant SCRAM occurs.

The reader is cautioned. The produced delay is variable with respect to the observed casualty. It is this variability which gives superior control. Explanation of this variability follows.

A transient monitor meter 30 is provided. Transient monitor meter 30 is a comparator having an analog output. Meter 30 dynamically displays the current startup range neutron density with respect to the current neutron density requiring the rod block and the current neutron density requiring plant SCRAM. The operator may dynamically watch the analog output of the comparator gauge in the illustrated bar graph format or on conventional needle monitor devices. The progress of the rate of increase versus the dynamically upranged permissible rate of neutron density increase can be observed and understood.

Transient monitor conditioner 36 is a conventional output to an analog comparator. It allows the relative comparison of the filtered and amplified outputs relative to the current observed reactor parameter, here neutron density. The standard circuit which can accomplish this function is disclosed as Divider Circuit AD533 in the Data Acquisition Databook 1982, Volume I, Integrated Circuits published by Analog Devices, Inc. at pages 6-18 through pages 6-20.

Transient Monitor Conditioner Specification (36)

Definitions: $Ref_{RB}$=Rod block trip reference level
Inputs: SRNM =startup range neutron monitoring signal
$Ref_s$=Scram trip reference level
Output: RS=relative SRNM signal with respect to the steady state level corresponding to measured scram and rod block trip reference signals Description of Operation Under steady state conditions the GETRAM filter has no effect on SRNM signal processing and, $Ref_s=G_s(SRNM)$, where $G_s$=scram trip reference gain factor, and $Ref_{RB}=G_{RB}(SRNM)$, where $G_{RB}$=rod block trip reference gain factor;

therefore, relative to the steady state SRNM signal, i.e., SRNM≡1, $$Ref_s = G_s$$

$$Ref_{RB} = G_{RB}.$$

Now, since $Ref_s$ and $Ref_{RB}$ differ only by a constant factor, and a display of the relative margins between these trip references and SRNM is most meaningful, it is desirable to display $Ref_s$ and $Ref_{RB}$ as stationary display levels of $G_s$ and $G_{RB}$, respectively. To do this and maintain measurement veracity requires that a (time variable) scale factor of $(G_s/Ref_s)$ be applied to the SRNM signal.

Signal Processing Requirement:
$$RS = (G_s/Ref_s)(SRNM)$$
Implementation Example: use AD533 IC as Divider

Transient Monitor Meter Specification

Definitions:
- $\tau$ = asymptotic period; that stable exponential rate of power increase which causes GETRAM to Just miss a specified trip reference level as determined by a stated $\lambda$, A parameter combination
- $\lambda$ = 1/(filter decay constan for a simple parallel resistance (R) and capacitance (C) filter network
- A = amplification factor by which SRNM signal is increased to derive a trip reference level; = $G_x$ (gain factor associated with trip "X")

Input(s): RS = relative SRNM signal with respect to the steady state level corresponding to mea sured scram and rod block trip reference signals Output: single display indication readable on two scales, $RS_1$ and $RS_2$

Description of Operation

Figure 12A:
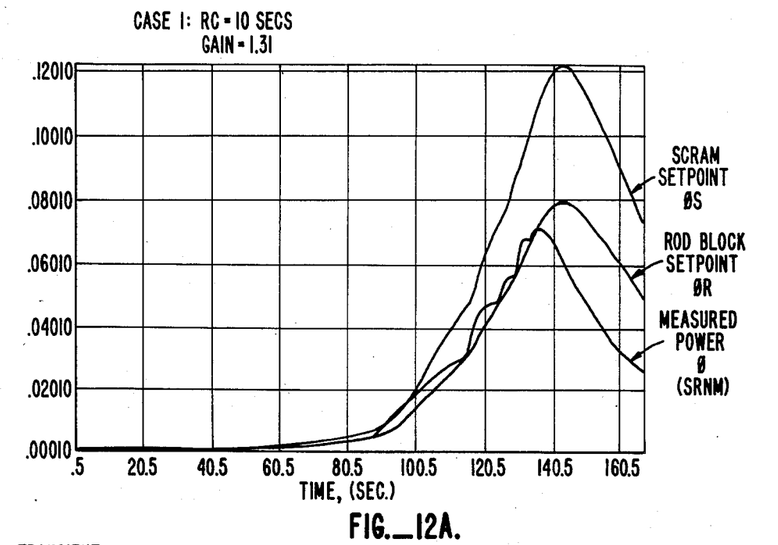
FIG. 12A is a plotted relationship between measured and set point power in a computer emulation of this invention.
Figure 12B:
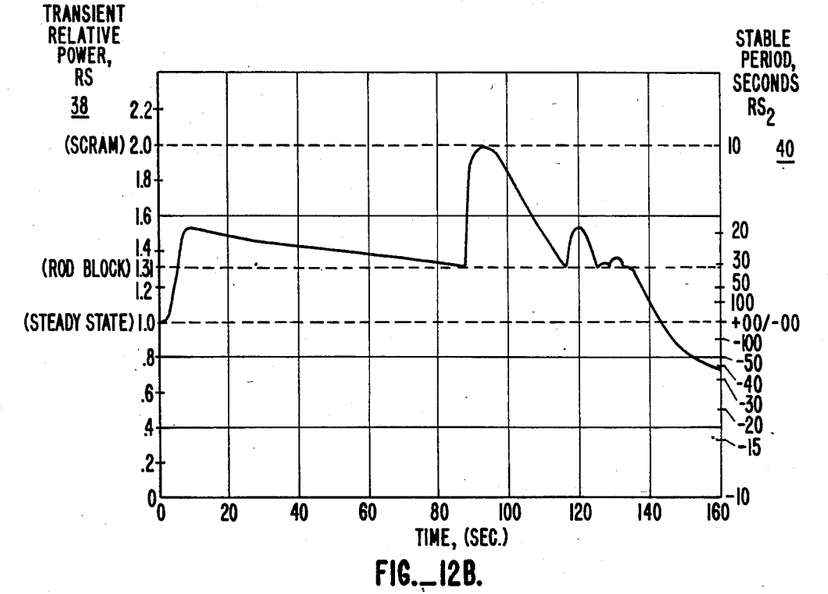
FIG. 12B is a plot of transient meter response to automated control rod withdrawal utilizing computer emulation.

This display provides an indicator displacement from the zero-input position that is linearly proportional to the input RS signal level. Dual display scales are provided. These scales are shown in FIG. 12B on opposite sides of the resultant graph. They may be calibrated conventionally to the bar gauge of FIG. 1. One scale 38 allows an interpretation as reactor power in variable units that maintain rod block and scram trip reference levels at stationary scale positions. The zero-input scale position corresponds to zero power and the unity position corresponds to operation under steady state conditions. During transient operation indications greater than unity correspond to increasing power, and less than unity to decreasing power. The utility of this linear scale is that it provides operators a good sense of the margins to rod block and scram trip reference levels over the many decades of startup power levels without a manual upranging requirement.

The second scale 40 provides a measure of the rate of power change in terms of stable reactor exponential period. The relationship between the two scales is as follows:

Because of the signal normalization used on scale 38, the trip amplification factor $(A = G_x)$ equals the trip level, i.e., the scale 38 indication, $RS_1$, which just equals (or just misses) the trip: $RS_1 = G_x$. Since the equation for the asymptotic period is $\tau = 1/[\lambda(G_x - 1)]$ and the scale 40 indication for $\tau$ is $RS_2$, the desired relationship is $$RS_2 = 1/[\lambda(RS_1 - 1)].$$

Indications Requirements (1) RS=0, i.e., zero-input, position defines $RS_1 = 0$ scale position
(2) $RS_1 = 0$ position shall be located between 5% to 10% of meter display scale
(3) $RS_1 = G_{max}$ position shall be located between 90% to 95% of meter display scale*
(4) $RS_1$ shall be linearly scaled between $RS_1 = 0$ and $RS_1 = G_{max}$ scale positions
(5) The device shall be calibrated such that $RS_1 = G_{max}$ when an input signal RS is input corresponding to a signal equal to $G_s = G_{max}$.
(6) The device shall indicate linearly proportional to input signal RS.

*$G_{max}$ = maximum trip reference gain for application.

(7) Scale 40 positions shall be related to scale 38 positions by the equation $RS_2 = 1/[\lambda(RS_1 - 1)]$.

Implementation Example: Can use any of many standard galvanometric-based devices whose indicator deflection is proportional to input electric current (or voltage).

Referring to FIG. 2, the prompt-jump phenomenon is illustrated. A reactor having a relative neutron flux density of one undergoes at time zero rod withdrawal. In the first 1 second, relative neutron flux density increases very rapidly. This density thereafter reaches a ramp portion 40 where increases in reactor firing maintains a mild exponential slope. Assuming no control rod movement, a steady state condition will eventually follow; this is not shown in FIG. 2.

Curve C shown on the same graph indicates a transient indicative of a casualty. It is the discrimination between the two types of curves to which this embodiment is directed. The slopes of the two events are initially approximately identical; it will, however, be noted that the exponential rate of increase of the casualty C is unabated. The problem is to detect the casualty as quickly as possible so that the momentum of the casualty is reduced.

Figure 3:
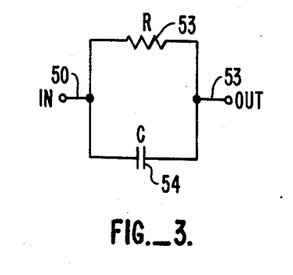
FIG. 3 is a diagram of a simple and exemplary filter utilized for tailoring the monitored reactor signal.

FIG. 3 is a simple filter. It includes an input 50 from the startup neutron range monitor and an output 52 to the amplifier. The filter includes a resistance 53 and a capacitance 54 in parallel between the respective input 50 and output 52. Dependent upon the values of the resistance and capacitance, a time constant will result in the simple filter here illustrated.

It will be apparent to the reader that numerous filter designs both of digital design and the illustrated filter of analog design could be used. The designed time constant of the filter is important for the purpose of this invention.

Further, it should be noted that the illustration of the apparatus of FIG. 1 is exemplary in its preferred embodiment. However, the signal could be amplified first and filtered second, if that should be desired. Also, variations such as using separate filters each with different time constants between the input 14 and amplifiers 22 and 24 are considered within the domain of this disclosure.

Figure 4A:
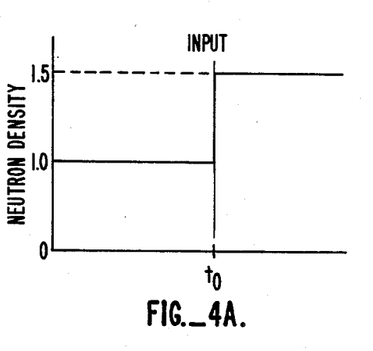
FIGS. 4A and 4B illustrate a square wave response passing through the filter of FIG. 3.
Figure 4B:
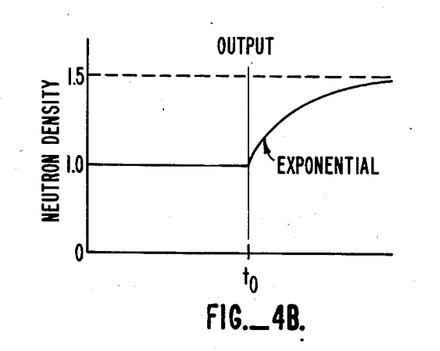

Referring to FIG. 4a and thereafter FIG. 4b, the response of the filter of FIG. 3 is illustrated. In FIG. 4a the neutron density suddenly jumps by a factor of 0.5 from 1.0 to 1.5 in a theoretical "square wave" format. This square wave jump occurs in an instantaneous step at time $t_o$.

FIG. 4b illustrates the time response of the filter to such an input signal. Specifically, and starting at time $t_o$, the filter exponentially and asymptotically tries to approach the 1.5 neutron density level. As is well known from electrical filter theory and related mathematics, the output of the filter will asymptotically approach but never exceed the 1.5 level.

Figure 5A:
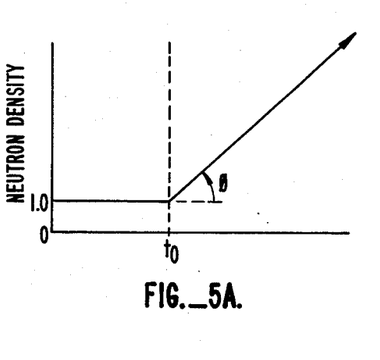
FIGS. 5A and 5B illustrate a ramp wave response passing through the filter of FIG. 3.
Figure 5B:
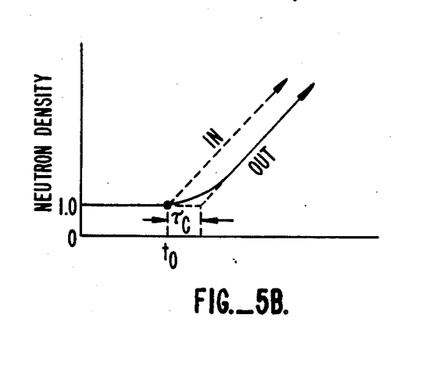

Referring to FIG. 5a and FIG. 5b, a ramp response of the filter is illustrated. In FIG. 5a, a ramping or constant rate of increases commences sharply at time $t_0$.

In FIG. 5b, the output of the filter responds to the ramp increase. However, this response is delayed. It is delayed by a time interval equal to the time constant of the filter.

As will hereinafter become more apparent with respect to FIGS. 8, 9 and 10, actual increase in the startup range neutron density can be crudely approximated by the addition of the curves of FIGS. 4a and 5a. Further, the output of the filter can be crudely approximated by the addition of the curves of FIGS. of 4b and 5b.

Having set forth in simplified format this invention, attention may now be devoted to equations more precisely descriptive of system performance.

An illustrative evaluation of the versatility of the apparatus of FIG. 1 can be provided where:

t = time
x = trip reference level
$\lambda = 1/$(filter time constant) $= 1/RC$ for simple single pole filter network
A = amplification (gain) factor
h = input monitored signal
$h_o$ = initial steady state value of h prior to a power increase transient
$\tau$ = period of assumed ideal exponential power increase transient Assume: $h(t) = h_o e^{t/\tau}$ (E-1)

Determine:
(1) X(t) response
(2) Time to trip
(3) Limiting relationship between parameters $\lambda$ and A such that system just misses trip during assumed transient—Asymptotic solution Basic differential equation:

$$\frac{dx(t)}{dt} + \lambda x(t) = \lambda A h_o e^{t/\tau} \quad \text{(E-2)}$$

Response solution:

$$x(t) = h_o A \left| \frac{\lambda}{\lambda + \frac{1}{\tau}} e^{t/\tau} + \frac{\frac{1}{\lambda}}{\lambda + \frac{1}{\tau}} e^{-\lambda t} \right| \quad \text{(E-3)}$$

Time to trip:

$$t_t = \frac{\ln\left(\frac{A}{1 - (A-1)\lambda\tau}\right)}{\lambda + \frac{1}{\tau}} \quad \text{(E-4)}$$

Asymptotic solution:

$$\lambda = \frac{1}{(A-1)\tau} \quad \text{(E-5)}$$

Figure 6:
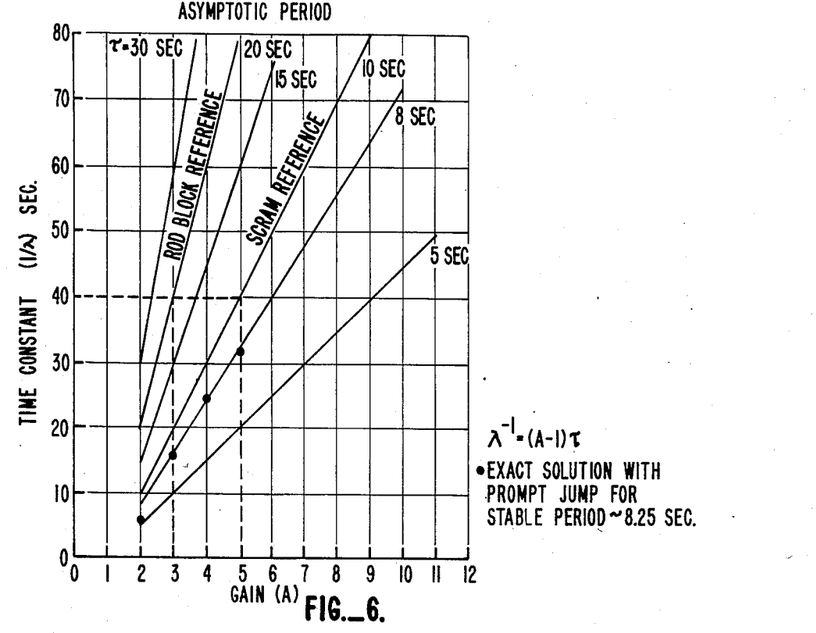
FIG. 6 is a plot of filter gain versus time constant illustrating how selection of filter time constant and amplification levels can be varied to produce desired responses to transients having various selected time periods (i.e. rates of increase)

Referring to FIG. 6 and utilizing the equations of E-5, a graph can be produced. Plotting equation E-5 relative to time constant and gain, the reader can see that for various time constants and amplifications, different response times can be evoked.

Remembering that in the period of one time constant an exponential transient increases in overall intensity by the Naperian base of approximately 2.72 times, points have been identified on the graph for causing rod block where reactor intensity exceeds a 2.72 gain in a 20 second period. For illustration in FIGS. 8, 9, 10 and 11, the filter is given a time constant of 40 which fixes the gain of the amplifier at a level of 3.

Similarly, a SCRAM is selected for illustration where the rate of increase in the reactor neutron density exceeds a factor of 2.72 within a period of 10 seconds or shorter. For this response as seen from the graph of FIG. 6, the gain needs to be 5 to maintain the time constant of the filter at 40 for both desired functions. Thus, in the preferred embodiment of FIG. 1, a single filter may be used with different amplification factors to produce the desired periodic responses. As should be apparent, other times of response with variant gains and time constants could all be designed using the graphic information of FIG. 6.

Figure 7:
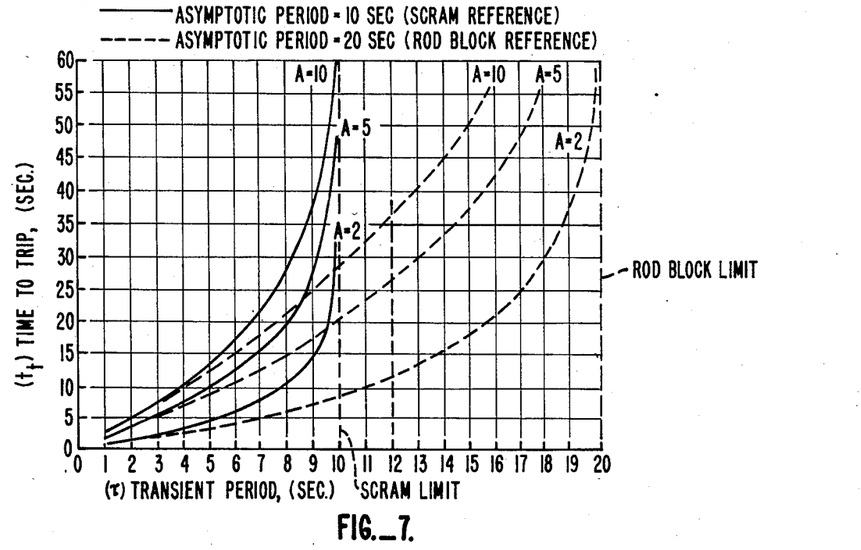
FIG. 7 is a time to trip graphic presentation illustrating how decreased amplification produces a shorter time to trip with this effect plotted for a single filter having a selected time constant with two comparators having two discrete levels of amplification.

Turning to FIG. 7, the specifics of the design parameters chosen in FIG. 6 are shown. Referring to FIG. 7, and assuming the 20 second transient period for rod withdrawal blockage, various amplification factors are plotted. It will be appreciated that each of the amplification factors will asymptotically approach the 20 second period chosen. It can be seen that for given events, the higher the amplification, the longer the period to produce a trip. For example, where a 12 second transient occurs at an amplification of 2, the rod block trip will occur in approximately 12 seconds. At an amplification of 5, the rod block trip will occur in approximately 27 seconds. At an amplification of 10, the rod block trip will occur in 37 seconds.

Referring further to FIG. 7, a 10 second SCRAM limit is also plotted. Again, it can be seen that the amplification factors change the response time. For example, where the neutron density increases by a factor of 2.72 in 7 seconds, at an amplification of 2, SCRAM trip will occur in 8 seconds. At an amplification of 5, SCRAM trip will occur in 16 seconds. At an amplification of 10, SCRAM trip will occur in approximately 22 seconds.

Referring to FIG. 7, a striking advantage of this system over the constant time period envelopes of the prior art will be immediately apparent. It can be seen that the more severe the rate of increase, the faster the time response of this system in identifying a casualty. For example, assuming the selected amplification factor of 5 and a 2.72 times increase in monitored startup neutron density within a 1 second period, it can be seen that SCRAM will be initiated in approximately 2 seconds. Stated in other terms, casualties are effectively immediately identified.

Figure 8:
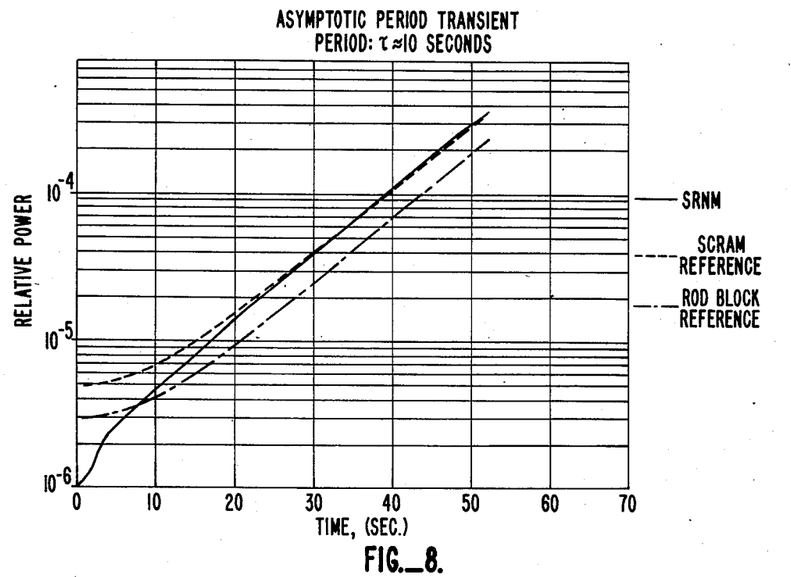
FIG. 8 is an asymptotic period transient illustrating the case of rod block with the transient asymptotically approaching the limit for reactor SCRAM.

Referring to FIG. 8, a plot is illustrated wherein the reactor experiences a rate of power increase of 2.72 times per every 10 second period. According to the selected parameters of FIG. 6, i.e., rod block and scram gains equal to 3 and 5, respectively, the monitored neutron range should asymptotically approach but never exceed the design SCRAM reference. This is illustrated in FIG. 8.

Referring further to FIG. 8, it can be seen that rod block has been exceeded. From approximately 8 seconds onward in such an event, the operator will be inhibited from further rod withdrawal.

This graphic plot also indicates the time availability for an operator to prevent SCRAM. While the time envelope for the operator to insert rods is, in this case, essentially infinite, it requires little imagination to understand the case where rod insertion could bring the monitored neutron density under control to prevent crossing of the SCRAM level.

Figure 9:
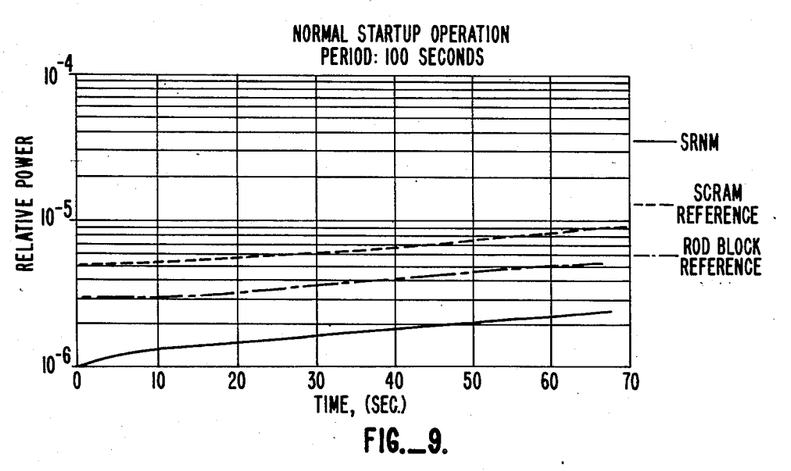
FIG. 9 is a diagram of normal reactor startup.

Referring to FIG. 9, a normal startup profile is illustrated. In this case, the monitored density falls well below rod block.

Figure 10:
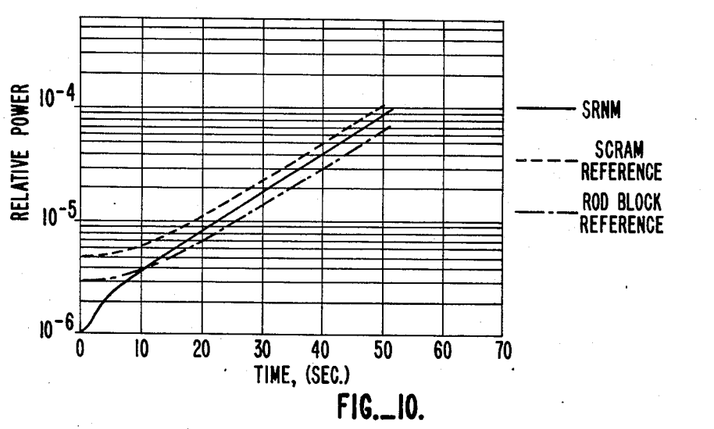
FIG. 10 is a rod block transient without SCRAM.

Referring to FIG. 10, a situation indicating rod block, but far short of SCRAM, is illustrated.

Figure 11:
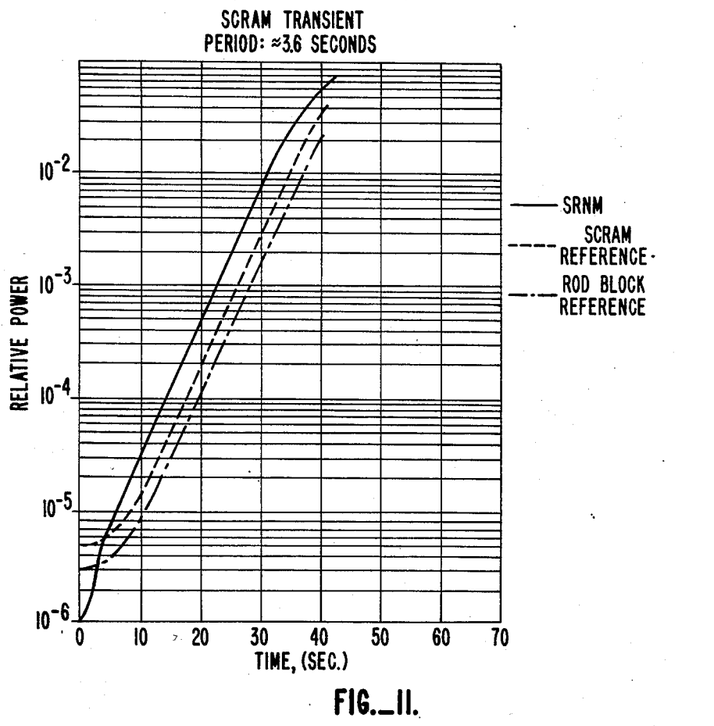
FIG. 11 is a 3.67 second period casualty transient with SCRAM trip response.

Finally, and with respect to FIG. 11, a SCRAM transient of 3.6 second period is illustrated. The reader will note that this is almost ⅓ of the 10 second design transient.

Following the plot of FIG. 11, it can be seen that SCRAM is initiated within a period slightly greater than 4 seconds. Simply stated, the initiation of SCRAM varies inversely with increasingly severe casualties.

The disclosed system can well find its way in computer implementation. Such computer implementation can be executed even by the novice engineer. Attached hereto is a computer implementation taken from a classroom exercise illustrating the implementation of this monitor in software.

SIMULATION

Automated Control Rod Withdrawal Simulation in a Boiling Water Reactor (BWR)

The assignment involved three main parts. The first involved a simple computer simulation of core power (SRNM signal) response to control rod withdrawal. The second involved a computer simulation of the response of this invention as illustrated in FIG. 1 to the simulated input power (SRNM) response. The programming required to accomplish this is typical of that that would be required in the most likely embodiment using state of the art digital microprocessor technology. The third part involved selecting optimum invention parameters that would achieve the most rapid startup without going so fast as to exceed the scram trip and automatically shutdown. Startup rod withdrawal was programmed to proceed according to a fixed plan at normal speeds except as interrupted by the rod withdrawal blocks of this invention. This is a technique that could be used in a real automatic startup implementation system and its success illustrates another invention use. The language FORTRAN is used.

Table 1 shows the control rod position and simulated core power time response (SRNM). FIG. 12A is a graphical illustration of the response. Once the reactor power level is determined for a particular time step, only a single line of programming each is needed to determine the rod block and scram trip reference levels, as illustrated by the excerpted coding of Table 2. These equations are of the very simple standard finite difference form:

$$T_{n+1} = T_n + \lambda \Delta t (G \times S_{n+1} - T_n)$$

where
  $n$ = time step subscript number
  $T_{n+1}$, $T_n$ = trip referernce level at solution time steps $n+1$ and $n$, respectively
  $\lambda = 1/RC = 1/$(filter time constant)
  $\Delta$ = time step
  $G$ = trip gain
  $S_{n+1}$ = SRNM (power) input at time step $n+1$ (current) from simulation (or measurement in actual implementation).

This finite element equation/procedure provides a solution to the more generalized Equation (E-2) for arbitrary input power (SRNM) signal, $S(t)$, of $$dx(t)/dt + \lambda x(t) = \lambda G S(t).$$

FIG. 12A shows the final optimized exercise solution including the rod block and scram trip reference levels. It is seen that the system succeeds in limiting control rod withdrawal such that scram is just missed at approximately 90 seconds into the startup control rod withdrawal.

As a final exemplification, the transient monitor meter response to the previous simulation has been determined, per the attached "Transient Monitor Meter Specification". FIG. 12B presents the graphical response in both display scale formats. Note that while the power response increases by a factor of approximately 600, that the displayed margin between scram trip and power level is less than two. It is that margin, not absolute power level, which is of primary interest to operators in the very low startup power range. The alternate scale also provides a measurement of stable rate of reactor increase in the traditional terms of reactor period. This stable period measurement will be much less erratic than the traditional instantaneous period instrumentation at low power levels.

TABLE 1

Automated Control Rod Withdrawal Simulation in a Boiling Water Reactor (BWR)

| Parameters | | BWR Parameters |
|---|---|---|
| RC = 10.0 sec | | Control Rod Withdrawal Speed = 3 inches/sec |
| $G_s$ = 2.0 | | Withdrawal Stroke = 12.0 feet |
| $G_{RB}$ = 1.31 | | Rod Total Reactivity = 0.0052 $\Delta$K/K |

Simulation Approximation: No Heat transfer from fuel to coolant (overheating explains transient turnaround due to Doppler reactivity feedback)

| TIME (SEC) | Rod Position (FT) | Fraction Rated Power | | | Fraction Steady State Power $RS_1=(G_s/Ref_s)(SRNM)$ | Stable Period, sec $RS_2=RC/(RS_1-1)$ |
|---|---|---|---|---|---|---|
| | | SRNM | $Ref_{RB}$ | $Ref_s$ | | |
| 0.00 | 0.00 | .100E−03 | .131E−03 | .200E−03 | 1.000 | ∞ |
| 4.99 | 1.25 | .132E−03 | .136E−03 | .208E−03 | 1.269 | 37.2 |
| 9.99 | 1.50 | .200E−03 | .172E−03 | .262E−03 | 1.527 | 19.0 |
| 14.99 | 1.50 | .258E−03 | .223E−03 | .341E−03 | 1.513 | 19.5 |
| 19.99 | 1.50 | .326E−03 | .287E−03 | .438E−03 | 1.489 | 20.5 |
| 24.99 | 1.50 | .407E−03 | .364E−03 | .556E−03 | 1.464 | 21.6 |
| 29.99 | 1.50 | .504E−03 | .457E−03 | .698E−03 | 1.444 | 22.5 |
| 34.99 | 1.50 | .621E−03 | .569E−03 | .868E−03 | 1.431 | 23.2 |
| 39.99 | 1.50 | .762E−03 | .703E−03 | .107E−02 | 1.424 | 23.6 |
| 44.99 | 1.50 | .932E−03 | .866E−03 | .132E−02 | 1.412 | 24.3 |
| 49.99 | 1.50 | .114E−02 | .106E−02 | .162E−02 | 1.407 | 24.6 |

TABLE 1-continued

Automated Control Rod
Withdrawal Simulation in
a Boiling Water Reactor (BWR)

Parameters  RC = 10.0 sec    Control Rod Withdrawal Speed = 3 inches/sec
            $G_s$ = 2.0       BWR Parameters Withdrawal Stroke = 12.0 feet
            $G_{RB}$ = 1.31   Rod Total Reactivity = 0.0052 ΔK/K
Simulation Approximation: No Heat transfer from fuel to coolant (overheating explains transient turnaround due to Doppler reactivity feedback)

| TIME (SEC) | Rod Position (FT) | Fraction Rated Power SRNM | Fraction Rated Power $\text{Ref}_{RB}$ | Fraction Rated Power $\text{Ref}_s$ | Fraction Steady State Power $RS_1 = (G_s/\text{Ref}_s)(SRNM)$ | Stable Period, sec $RS_2 = RC/(RS_1 - 1)$ |
|---|---|---|---|---|---|---|
| 54.99 | 1.50 | .138E−02 | .130E−02 | .198E−02 | 1.394 | 25.4 |
| 59.99 | 1.50 | .166E−02 | .157E−02 | .240E−02 | 1.383 | 26.1 |
| 64.99 | 1.50 | .200E−02 | .190E−02 | .291E−02 | 1.375 | 26.7 |
| 69.99 | 1.50 | .238E−02 | .229E−02 | .350E−02 | 1.360 | 27.8 |
| 74.99 | 1.50 | .282E−02 | .274E−02 | .418E−02 | 1.349 | 28.7 |
| 79.99 | 1.50 | .331E−02 | .325E−02 | .496E−02 | 1.335 | 29.9 |
| 84.99 | 1.50 | .384E−02 | .382E−02 | .584E−02 | 1.315 | 31.7 |
| 89.99 | 2.00 | .736E−02 | .501E−02 | .765E−02 | 1.924 | 10.8 |
| 94.99 | 2.00 | .122E−01 | .814E−02 | .124E−01 | 1.968 | 10.3 |
| 99.99 | 2.00 | .181E−01 | .129E−01 | .196E−01 | 1.847 | 11.8 |
| 104.99 | 2.00 | .240E−01 | .188E−01 | .287E−01 | 1.672 | 14.9 |
| 109.99 | 2.00 | .283E−01 | .251E−01 | .383E−01 | 1.478 | 20.9 |
| 114.99 | 2.04 | .309E−01 | .305E−01 | .466E−01 | 1.326 | 30.7 |
| 119.99 | 2.50 | .465E−01 | .398E−01 | .608E−01 | 1.530 | 18.9 |
| 124.99 | 2.61 | .495E−01 | .489E−01 | .747E−01 | 1.325 | 30.8 |
| 129.99 | 3.26 | .613E−01 | .585E−01 | .894E−01 | 1.371 | 27.0 |
| 134.99 | 3.80 | .701E−01 | .705E−01 | .108E+00 | 1.298 | 33.6 |
| 139.99 | 5.05 | .670E−01 | .788E−01 | .120E+00 | 1.117 | 85.5 |
| 144.99 | 6.30 | .571E−01 | .796E−01 | .122E+00 | .936 | −156.3 |
| 149.99 | 7.55 | .475E−01 | .750E−01 | .114E+00 | .833 | −59.9 |
| 154.99 | 8.80 | .396E−01 | .677E−01 | .103E+00 | .769 | −43.3 |
| 159.99 | 10.05 | .334E−01 | .597E−01 | .911E−01 | .733 | −37.5 |
| 164.99 | 11.30 | .285E−01 | .520E−01 | .794E−01 | .718 | −35.5 |
| 167.79 | 12.00 | .263E−01 | .480E−01 | .733E−01 | .718 | −35.5 |

TABLE 2

SOLUTION ALGORITHMS:

F = F + DELTA_T*((RHO−BETA_T)*F/GAMMA+SIGMA)
F_S = F_S+DELTA_T*(G_S*F-F_S)/RC
F_R = F_R+DELTA_T*(G_R*F-F_R)/RC
where
F = Flux (power)
F_S = Flux Scram Reference
F_R = Flux Rod Block Reference
DELTA_T = Time Step
G_S = Scram Gain
G_R = Rod Block Gain
RC = Filter Time Constant The reader will understand that the design parameters here shown for neutron density could be applied to other parameters within a nuclear power plant. For example, the pressure within a reactor vessel could as well be monitored for rate of increase.

In addition to having rod block, a standard BWR control rod worth minimizer could as well be present. Thus, the rod worth minimizer programmed sequence of rod movements within a reactor could be automated and interrupted by rod blocks allowing the rate of neutron increase to settle within desired safety limits without inadvertent scram.

These and other modifications may be made to the invention.

Although the foregoing has been a description of the preferred embodiment of the invention, examples thereof, and the best mode for carrying it out, this description is intended to illustrate and explain the invention, rather than limit it. The scope of the invention may be ascertained from the appended claims.

What is claimed is:

1. A startup range transient monitor for a reactor comprising in combination:
   a comparator having first and second inputs and an output for indicating an exceeded limit;
   a monitored reactor parameter signal directly channeled to one input of said comparator;
   a filter having a preselected time constant for filtering and an amplifier for amplifying said monitored reactor parameter signal and passing said signal to the other input of said comparator whereby the output of said comparator flags the exceeding of limit when said direct signal in one input exceeds said filtered and amplified signal in the other input.

2. The apparatus of claim 1 and wherein the output of the comparator is binary.

3. The apparatus of claim 1 and wherein said signal is filtered before it is amplified; or amplified before it is filtered.

4. The apparatus of claim 1 and wherein said monitored signal is neutron density.

5. The invention of claim 1 and wherein said monitored parameter is pressure in said reactor vessel.

6. A process for monitoring a reactor parameter including the steps of providing a comparator having two inputs and an output indicating the state of one input relative to the other input;
   inputting a monitored reactor parameter to one input of said comparator;
   providing a filter having a time constant;
   providing an amplifier;
   filtering and amplifying the same monitored parameter to the other input of said comparator;
   comparing said inputs to determine the state of one input relative to the other input.

7. The invention of claim 6 and wherein the comparator output is binary and blocks rod withdrawal.

8. The apparatus of claim 6 and wherein said comparator output is binary and initiates SCRAM.

9. The process of claim 6 and wherein said comparator output is displayed to an operator relative to the filtered and amplified parameter.

10. The process of claim 6 and wherein the monitored parameter is neutron density.

11. The process of claim 6 and wherein the monitored parameter is reactor vessel pressure.

12. The apparatus of claim 6 including the step of adjusting the time constant of said filter to produce variable response at said comparator.

13. The process of claim 6 including the step of adjusting the amplification to produce variable time response at said comparator.

14. The apparatus for monitoring neutron density in a nuclear reactor comprising:
a startup range neutron density monitor;
a first comparator having two inputs and a binary output to initiate rod withdrawal blockage;
a second comparator having two inputs and a binary output to initiate plant SCRAM;
the output of said startup neutron monitor being input to each of said comparators at one input thereof;
a filter for having a preselected time constant for processing the monitored neutron range density;
a first amplifier;
said filter passing its output to said first amplifier having an amplification level to the other input of said first comparator to initiate rod block when said directly monitored signal exceeds said filtered signal;
a second amplifier;
said filter having a second output to said second amplifier for initiating plant SCRAM when said directly monitored output exceeds said filtered and amplified input to said comparator.

15. The invention of claim 14 and wherein said rod block amplification is less than said SCRAM input amplification.

16. The invention of claim 14 and including a analog comparator for display to an operator illustrating the comparison of said monitored parameter with respect to the compared parameter level of rod block and the level of SCRAM.

17. The invention of claim 16 and wherein said analog comparator is scaled to display rate of reactor power increase in terms of the standard reactor period.

18. The invention of claim 16 and wherein said analog comparator is scaled to display rate of reactor power increase relative to a rod block level and a SCRAM level.

* * * * *